United States Patent Office 3,147,077
Patented Sept. 1, 1964

3,147,077
PRODUCTION OF TITANIUM DIOXIDE
Alan Edward Callow, Normanby, Middlesbrough, and Reginald George Wynne, West Hartlepool, England, assignors to British Titan Products Company Limited, Durham, England, a corporation of the United Kingdom
No Drawing. Filed June 29, 1960, Ser. No. 39,439
Claims priority, application Great Britain June 24, 1960
13 Claims. (Cl. 23—202)

This invention relates to the production of titanium dioxide by vapour phase oxidation of a titanium tetrahalide, especially titanium tetrachloride. The invention is primarily concerned with producing such titanium dioxide in finely divided pigmentary form.

Such process of vapour phase oxidation may be carried out in an "empty space" reaction chamber or in a reaction chamber in which inert solid material is present for receiving heat of reaction and transmitting heat to the incoming reactants. A particular example of the latter is that where the reaction is caused to take place in a fluidised bed of particulate inert solid material.

According to the present invention, a method for effecting this vapour phase oxidation comprises reacting the titanium tetrahalide with activated oxygen. Activated oxygen is used as the oxidant at least in an initial stage of the oxidation process as a whole, subsequent stages optionally employing other oxidants.

By "activated oxygen" we mean oxygen in a dissociated state or atomic form, ordinarily designated by the formula [O]. This is usually liberated in the nascent state as nascent oxygen, from a compound containing the oxygen atom in loose or relatively unstable combination. A particular example of this is ozone, but there are various others including halogen oxides such as chlorine monoxide or chlorine dioxide which may be produced directly from, for instance, chlorates or perchlorates. A further particular example of a suitable oxygen compound is hydrogen peroxide.

On the other hand, the activated oxygen, instead of being produced by liberation from an oxygen compound, may be produced as such by high voltage discharge or by high energy radiation, e.g., gamma rays or X-rays, through oxygen or oxygen-containing gases. If produced in this way for the purpose of the invention the high voltage discharge or high energy radiation will normally be applied at or near to the point of the oxidation reaction, e.g., to the oxygen or oxygen-containing gas, which may be mixed with the titanium tetrahalide, immediately prior to or actually within the reaction zone.

Normally it is preferred to use activated oxygen as liberated from an oxygen compound. When thus liberated the nascent activated oxygen may have a very short period of existence as such due to its entering into some form of re-combination, for example recombination to form molecular oxygen. However, by appropriate control of the conditions of the process of oxidation according to the invention the nascent activated oxygen is available for immediate reaction with the titanium tetrahalide at the desired place. Such control is particularly in respect of the temperature conditions obtaining when the activated oxygen, or compound liberating the same, is brought into the presence of the halide. For example, in the case of ozone, which decomposes at a temperature in the neighbourhood of 300–400° C., this would not normally be pre-admixed with the halide at a temperature higher than that of the decomposition.

We have found that the activated oxygen reacts with a titanium tetrahalide such as titanium tetrachloride at temperatures substantially below those required for reaction between molecular oxygen and the halide. This fact has inspired the most important practical feature of the invention which is to utilize this activated oxygen reaction as an initial phase or stage in or to a main process of oxidation of the halide by means of molecular oxygen and/or water vapour. The initial phase or stage thus serves to produce titanium oxide nuclei for the main reaction with the result of improving the main product especially as regards the particle size of the titanium oxide particles which is rendered particularly favourable for developing pigment properties.

Accordingly, there may be used in carrying out an important embodiment of the present invention, any known process for the vapour phase oxidation of titanium tetrahalide provided that activated oxygen is made available to react initially with the halide. This may be effected by introducing with the normal oxygen or oxygen-containing gas, entering the reaction zone, a small proportion of activated oxygen or compound which will liberate the same. During the heating up of the reactants in the reaction zone to the normal reaction temperature, e.g., 800–1100° C., the activated oxygen will have reacted to produce titanium oxide nuclei.

Of course, it will be understood that the activated oxygen or compound liberating the same may be introduced separately from the other reactants, provided it is given the first opportunity of reacting with the halide, or it may be admitted with the halide, or the oxygen-containing gas in which it is carried may be pre-mixed with the halide. In the two latter cases, it is preferable, but not essential, that the temperature of the mixture before entering the reaction zone should not be so high as to cause oxidation with the main oxygen content of the stream to occur.

The reaction may be caused to be carried out, as has been noted hereinabove, in an empty space, or in a fluidized bed of inert particulate solids. Further if desired, a first portion of the reaction may be carried out within a fluidized bed of inert solids, and the remainder in the space above the fluidized bed. In carrying out the reaction is a fluidized bed, good control of the temperature in the reaction zone is readily possible. By controlling the temperature of the bed, regulation of the reaction to ensure that the titanium tetrahalide reacts with the activated oxygen prior to the commencement of the main reaction between the titanium tetrahalide and oxygen is readily achieved. Such a two-step reaction, as has been previously pointed out, considerably enhances the pigmentary characteristics of the product produced.

Although the process is preferably carried out by contacting mixtures of activated oxygen and oxygen-containing gas with titanium tetrachloride, it should be understood that reaction solely between "activated" oxygen and titanium tetrahalide to produce finely divided titanium dioxide is also contemplated herein. The requisite amount of activated oxygen can be supplied by any of the procedures described hereinabove. In carrying out this embodiment of the present invention, introduction into the reaction zone of oxygen or an oxygen-containing gas is not necessary.

Alternatively, if desired, a first or initial portion of the reaction may be carried out using only activated oxygen, the amount of activated oxygen being stoichiometrically insufficient to react with the titanium tetrachloride. The unreacted titanium tetrachloride may then be oxidized by contacting the mixture produced by the initial reaction with oxygen or an oxygen-containing gas. Such an embodiment is a true two-stage reaction in which each stage is carried out consecutively rather than simultaneously. If the material used to produce the nascent oxygen liberates oxygen gas simultaneously with the evolution of the activated oxygen, as will happen if such material is ozone, the initial reaction, of course will be carried out in the presence of oxygen gas. By regulating the temperature in the first part of the reaction zone, however, reaction between the tetrahalide and the evolved oxygen gas is prevented, while reaction between the evolved activated oxygen and the tetrahalide is caused to occur. An analagous situation arises if hydrogen peroxide is used as the material to produce the nascent oxygen, in which case water will also be liberated instead of the oxygen liberated by ozone.

Additionally, if desired, the titanium tetrahalide stream as it passes through the reaction zone may be contacted successively with a stream containing only activated oxygen as an oxidizing medium and with a stream containing oxygen gas as an oxidizing medium. In carrying out this embodiment, the first stream in point of time to contact the tetrahalide should be that containing the activated oxygen.

The procedure employing in carrying out the present invention is given in the following examples, which though limited, are not intended to limit the scope of the invention in any way:

*Example 1*

This example illustrates the incorporation of hydrogen peroxide in the oxygen stream in the fluid bed oxidation of titanium tetrachloride. The apparatus consisted of a fused silica tube 3″ in internal diameter fitted with a plug at the base through which protruded two tubes for the respective admission of titanium tetrachloride vapor and oxygen. Zircon sand, which had been used in previous experiments and consequently was coated with titanium oxide, was used as the bed material. It had a particle size range such that all the sand passed through a 44 mesh BSS sieve and was retained on a 72 BSS sieve. The reactor was filled with this sand to a height of 6″ above the base. The reactor was contained within an electric furnace in order accurately to control the temperature of the bed material.

Prior to conducting the experiment, air was fed into the reactor to fluidise the zircon sand and the reactor was heated until the bed had attained a temperature of 900° C. Thereafter titanium tetrachloride, which had been vaporised by means of a preheater, was admitted through one of the injection tubes at the rate of 54 mls./min. Oxygen was bubbled through a hydrogen peroxide solution to pick up 0.9 g./min. of $H_2O_2$ and the oxygen stream was then led into the reactor at a rate of 18 l./min.

The titanium oxide issuing from the reactor suspended in the product gases was separated from these gases and found to have a tinting strength of 1530 (Reynolds scale) and a rutile content of 95.9%.

An experiment conducted in an identical fashion except that no hydrogen peroxide was added to the oxygen stream, gave a pigment having a tinting strength of 1280 on the Reynolds scale and a rutile content of 32%.

*Example 2*

This example illustrates the incorporation of hydrogen peroxide in the oxygen stream in the oxidation of titanium tetrachloride in a burner system. The reactor consisted of a fused silica tube 8″ in diameter contained in an electric furnace and mounted vertically. A simple burner, consisting of two tubes protruding 3″ into the reaction tube with their orifices 1″ apart and arranged so that the gas flows met at a point 3″ below the orifices, was cemented into the top of the reactor. The tube used for the injection of titanium tetrachloride vapour had an orifice of 4 mm. in diameter and the one for the admission of oxygen had an orifice 2 mm. in diameter. Prior to conducting the reaction the reactor was raised to a temperature of 950° C. by means of the electric furnace. Titanium tetrachloride vapour was preheated to 850° C. and fed to the reactor at the rate of 20 mls. liquid $TiCl_4$/min. Oxygen was passed through 30% w./w. solution of hydrogen peroxide to pick up 3.1% w./w. of hydrogen peroxide solution (calculated on $TiC_2$ content of the titanium tetrachloride) and fed to the reactor in amount to give an $O_2$:$TiCl_4$ molar ratio of 3:1.

The product was a pigment of high brightness containing 98.8% rutile and having a tinting strength of 1200 on the Reynolds scale.

A similar experiment was conducted except for the fact that no hydrogen peroxide was added to the oxygen stream and this gave a pigment having a rutile content of only 13% and a tinting strength of less then 500.

*Example 3*

This example illustrates the incorporation of ozone in the oxygen in the oxidation of titanium tetrachloride in a turbulent burner system. 1 litre/min. of oxygen was passed through a volume of titanium tetrachloride maintained at 65° C. to pick up 0.26 gram of titanium tetrachloride/min., and fed to a reactor consisting of a silica tube 1″ in diameter and 24″ long contained in an electric furnace and heated to 600° C. A separate stream of oxygen metered at the rate of 2 litres/min. and containing 2.6% by volume of ozone was led into the first stream immediately prior to admission to the reactor. The product leaving the tube was found to be very finely divided titanium oxide in the anatase form having a particle size of $0.03\mu$.

Mounted below this initial reactor was a second reactor consisting of a silica tube 8″ in diameter, contained in an electric furnace and maintained at a temperature of 900° C. Cemented into the top of the reactor was a simple burner unit consisting of 2 tubes, one for the admission of titanium tetrachloride vapour and one for the admission of the products from the initial reactor with addition of further oxygen. Titanium tetrachloride preheated to 900° C. and metered at the rate of 20 mls. liquid titanium tetrachloride/min. at room temperature was fed to the reactor through its appropriate jet. The gas stream carrying the very finely divided titanium oxide from the initial reactor was mixed with an additional 9 litres/min. of oxygen measured at room temperature and the combined stream was fed to the reactor through the second jet.

The titanium oxide product issuing from the second reactor was separated from the gas stream and found to be a pigment having a tinting strength of 1230 on the Reynolds scale. A similar experiment conducted without the addition of ozone gave a pigment having a tinting strength of less then 700.

The term "oxidation" is used broadly herein to refer to the conversion of titanium tetrahalide to titanium dioxide. This includes, not only strict oxidising reactions, but also hydrolysing reactions which will effect the same conversion. Correspondingly, the term "oxidant" or "oxygen-containing gas" is used to include water vapour.

What is claimed is:

1. A method of preparing pigmentary titanium dioxide which comprises reacting titanium tetrahalide vapour with a gaseous mixture comprising oxygen gas having the formula $O_2$, and activated oxygen having the formula [O].

2. A method of preparing titanium dioxide pigment which comprises establishing a reaction zone having a temperature high enough to cause oxygen to react with titanium tetrachloride, introducing into the reaction zone separate converging streams comprising oxygen gas, titanium tetrachloride vapour, and nascent oxygen, respectively, maintaining the temperature at the point of contact of the streams high enough to cause reaction between nascent oxygen and the tetrachloride to produce titanium dioxide particles, but low enough to prevent reaction between the oxygen gas and the tetrachloride to thereby cause the tetrahalide to react first with nascent oxygen and then reacting the remaining unreacted chloride with oxygen gas at oxidation temperatures to produce a hot mixture of titanium dioxide in resulting reaction gases, and removing the hot mixture from said zone.

3. The method of claim 12 wherein the activated oxygen is introduced into the zone in the form of a material capable of liberating activated oxygen, and wherein the activated oxygen is liberated from the material in the reaction zone.

4. A method of producing finely divided titanium dioxide pigment which comprises establishing a flowing stream of titanium tetrahalide in a reaction zone having a temperature high enough to cause the tetrahalide to react with oxygen, projecting into the flowing tetrahalide separate streams comprising activated oxygen and oxygen gas, respectively, contacting the tetrahalide stream with the activated oxygen prior to contacting it with the oxygen gas to produce a hot mixture of titanium dioxide in resulting reaction gases, the amount of said activated oxygen and oxygen gas being sufficient to oxidize said tetrahalide to titanium dioxide while the amount of said activated oxygen being insufficient to completely convert said tetrahalide to titanium dioxide and removing the hot mixture from the zone.

5. A method of producing finely divided titanium dioxide pigment which comprises establishing a bed of inert solids suspended in an upwardly rising stream of a gaseous mixture comprising titanium tetrachloride vapour, oxygen gas, and activated oxygen, maintaining the temperature of the bed high enough to cause titanium tetrachloride to react with the oxygen gas and the activated oxygen to thereby produce a hot mixture of titanium dioxide in resulting reaction gases, the amount of said activated oxygen introduced to said bed being less than is required to completely convert said tetrachloride through oxidation to titanium dioxide, and removing the hot mixture from the bed.

6. A method which comprises establishing a reaction zone having a temperature high enough to cause titanium tetrachloride to react with activated oxygen, introducing titanium tetrachloride vapour and an amount of a material capable of liberating activated oxygen into said zone such that the amount of liberated activated oxygen present in said zone is insufficient to completely convert the titanium tetrachloride present in the zone to titanium dioxide, generating said activated oxygen in said zone, reacting the activated oxygen with the titanium tetrachloride to produce titanium dioxide particles and contacting the resulting unreacted titanium tetrachloride and the particles with oxygen gas in a zone having a temperature at which said oxygen gas reacts with said titanium tetrachloride.

7. The methhod of claim 6 wherein said material is taken from the group consisting of oxygen, oxygen containing gas, ozone, hydrogen peroxide, and halogen oxides.

8. The method of claim 6 wherein said material is taken from the group consisting of oxygen and an oxygen containing gas, and the activated oxygen is generated by passing high energy radiation through the reaction zone.

9. The method of claim 8 wherein the activated oxygen is generated by passing a high voltage discharge through the reaction zone.

10. The method of claim 6 wherein the activated oxygen is generated by the heat in the reaction zone.

11. In the vapor phase oxidation of a titanium tetrahalide to produce pigmentary titanium dioxide, the improvement which comprises contacting said titanium tetrahalide with an amount of nascent oxygen which is less than stoichiometric for converting all of said tetrahalide to said pigmentary titanium dioxide in a zone having a temperature at which said nascent oxygen reacts with said tetrahalide and introducing said nascent oxygen into said zone mixed with a vapor stream comprising oxygen gas.

12. In the vapor phase oxidation of a titanium tetrahalide to produce pigmentary titanium dioxide, the improvement which comprises introducing nascent oxygen and oxygen gas into a reaction zone as separate streams and contacting titanium tetrachloride with an amount of nascent oxygen which is less than stoichiometric for converting all of said tetrahalide to said pigmentary dioxide prior to contact of the tetrachloride with the oxygen gas, said contact being effected in a zone having a temperature at which the said nascent oxygen reacts with the tetrahalide.

13. In the vapor phase oxidation of a titanium tetrahalide to produce pigmentary titanium dioxide, the improvement which comprises introducing a mixture comprising nascent oxygen, $O_2$ and titanium tetrachloride into a reaction zone at a temperature nascent oxygen reacts with titanium tetrahalide, the amount of said nascent oxygen being less than stoichiometric for converting all of said tetrahalide to said pigmentary titanium dioxide.

References Cited in the file of this patent

UNITED STATES PATENTS

| | | |
|---|---|---|
| 2,779,662 | Frey | Jan. 29, 1957 |
| 2,828,187 | Evans | Mar. 25, 1958 |

OTHER REFERENCES

Mellor: "A Comprehensive Treatise on Inorg. and Theo. Chem.," vol. 1, 1922 ed., pages 906, 907, Longmans, Green and Company, New York.

McPherson and Henderson: "A Course in General Chemistry," 3rd ed. (1927), pages 229–230, Ginn and Company, New York.